Figure 1:
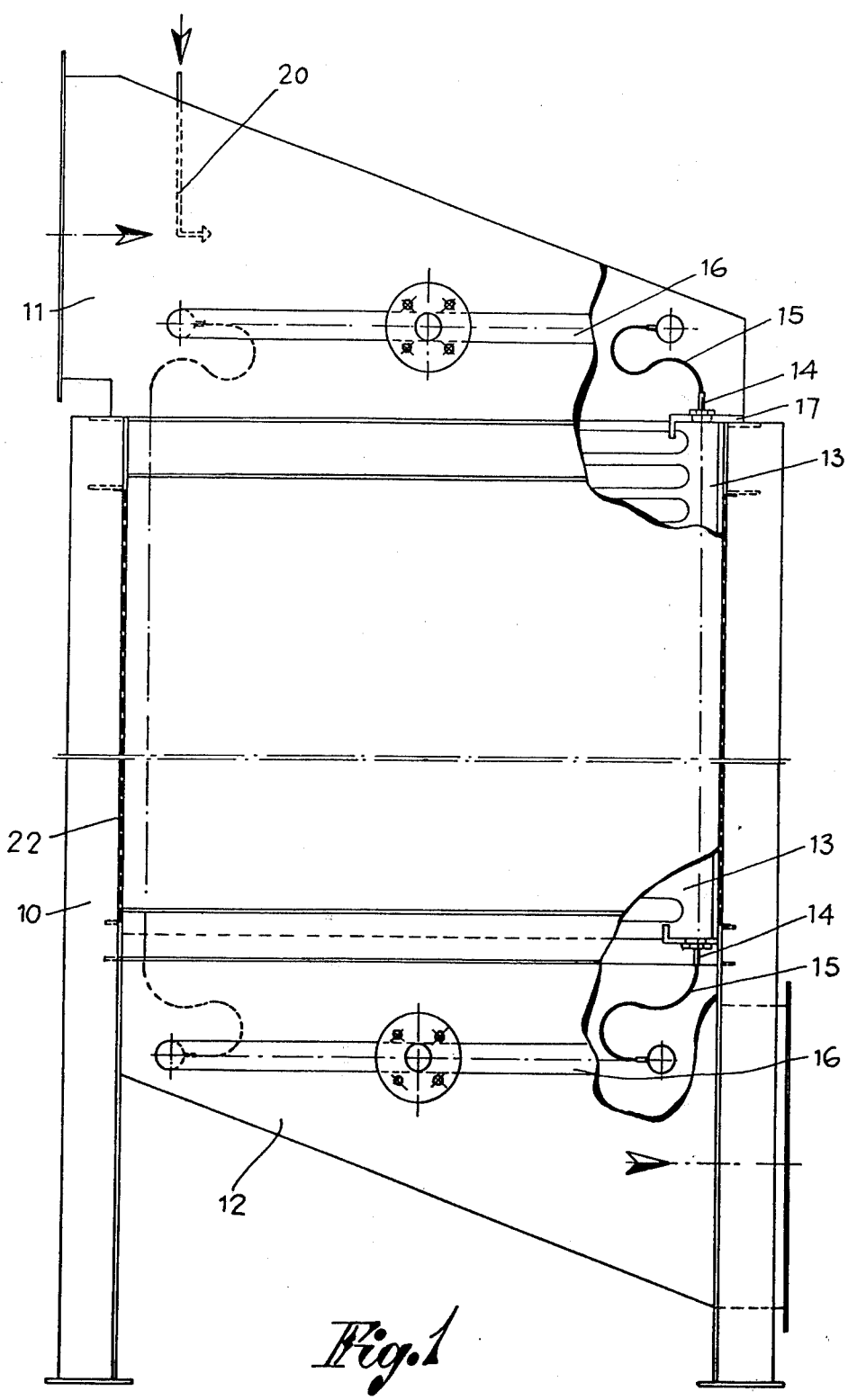

United States Patent [19]

Schraud et al.

[11] 4,068,709
[45] Jan. 17, 1978

[54] DEVICE FOR CLEANING AND HEAT RECOVERY FROM THE EXHAUST GASES IN HEAT TREATMENT AND DRYING INSTALLATIONS

[75] Inventors: Alfred Schraud, Maschen near Hamburg; Wolfgang Dressler, Wuppertal, both of Germany

[73] Assignee: Artos Dr.-Ing. Meier Windhorst Kommanditgesellschaft, Hamburg, Germany

[21] Appl. No.: 624,795

[22] Filed: Oct. 22, 1975

[30] Foreign Application Priority Data

Oct. 24, 1974 Germany .............................. 2450497

[51] Int. Cl.$^2$ ................................................ F28D 9/00
[52] U.S. Cl. .......................................... 165/95; 165/74; 165/119; 55/22; 122/390; 34/86
[58] Field of Search .......................... 165/76, 77, 8, 157, 165/165, 166; 55/222; 209/144; 122/225, 231, 198, 419, 426, 422, DIG. 3, DIG. 11, DIG. 14, 390; 261/116, 76; 34/86

[56] References Cited

U.S. PATENT DOCUMENTS

| | | | |
|---|---|---|---|
| 2,303,157 | 11/1942 | Bush | 165/166 X |
| 2,375,702 | 5/1945 | Smith | 165/166 X |
| 2,424,792 | 7/1947 | Blum | 165/77 |
| 2,601,974 | 7/1952 | Hytte | 165/78 |
| 3,262,685 | 7/1966 | Pike et al. | 55/222 X |

Primary Examiner—Charles J. Myhre
Assistant Examiner—Theophil W. Streule, Jr.
Attorney, Agent, or Firm—Allison C. Collard

[57] ABSTRACT

A device for the cleaning and heat recovery from the exhaust gases in a production installation for drying and heat treatment in the textile industry consisting of a housing having parallel double walled plates positioned with small intermediate spaces therebetween so that an exhaust air supply can be provided above the plates and exhaust below the plates and a countercurrent cooling fluid can flow through the double wall plates from below to above. This results in an improved heat exchange between the fluid and the air. In addition, a turbulance can be created by the air flowing through the device to improve the transfer and the plates can also be corrugated in further embodiments. Plates can be easily removed for cleaning by means of novel connecting devices.

5 Claims, 2 Drawing Figures

DEVICE FOR CLEANING AND HEAT RECOVERY FROM THE EXHAUST GASES IN HEAT TREATMENT AND DRYING INSTALLATIONS

This invention relates to a device for the cleaning and heat recovery from the exhaust gases in production installations of drying and heat treatment devices in the textile industry.

More particularly, the invention relates to a device wherein steam-like impurities of the exhaust gases are condensed for the purpose of separation while simultaneously, the hot air released during the cooling of the exhaust gases is used for heating purposes, such as, for example, for heating water.

In many production processes, when hot air is applied onto the treatment mediums for the goods, from the pretreatment process, weaving oils, softeners and dyes are released which enter the exhaust gas of the production installation admixed with dust, etc. Since these materials are a nuisance due to odor, color and sedimentation, and may even be harmful to the environment, attempts have been made to eliminate impurities in the exhaust air.

To separate the predominantly steam-like substances, it is necessary to cool the exhaust gases for the purposes of condensation. Hitherto, air washers were employed which are also used in dust collecting equipment. The cooling water which is injected directly into the exhaust gases gets polluted and cannot be used for employing the absorbed heat. The more advantageous method of indirect cooling wherein the exhaust gas to be cooled and the cooling medium are separated by metal walls could not be used, because of the danger of pollution of the commonly used bunched pipe heat exchangers.

It is therefore an object of the present invention to provide a device wherein parallel double walled plates are positioned perpendicular with very small intermediate spaces therebetween, whereby the air supply is provided above these plates and the air exhaust below, and whereby the cooling fluid flows through the double walled plates from below to above. Thus, the air to be cooled moves with high speed between the smooth faced plates from below to above. Due to the flow energy of the air and due to gravity, the condensate film and the dirt layer are kept very thin while simultaneously obtaining a very good heat transfer. This requires very small intermediary spaces between the double walled cooling plates.

The heat transfer may be increased and the required plate surface may be decreased if a turbulence is created for the gas stream in the space between the plates. For this purpose, the surfaces of the double walled plates are provided with corrugations, grooves, etc., which extend lateral with respect to the flow direction of the gas. In order to easily remove the cooling plates for cleaning after an extended period of operation, (which may result in the plates becoming polluted) the plates are flexibly and slidably connected within the housing with a common connection means for the supply and discharge means for the cooling liquid. Therefore, the intermediate spaces between two plates can be increased by a multiple for cleaning purposes.

In the preferred embodiment of the invention, the cooling plates are mounted within the housing by means of plate carriers and distance spacers in combination. A very simple mounting of the plates within the housing is obtained when the plate carriers and the distance spacers are mounted on the cooling plates by means of the connecting sockets for the cooling medium connection. When impurities, which are only soluble by chemical means, are separated from the surface of the cooling plates, it is advantageous to provide within the air supply means toward the housing a line and nozzle for injection of a chemical cleaning medium. The impurities which are condensed during cooling are mainly removed from the gaseous stream in the form of droplets and mist, and are collected in the air exhaust and in subsequent collecting devices, such as, for example, droplet separators, cyclons, electro-filters, fiber layer filters, etc..

Other objects and features of the present invention will become apparent from the following detailed description when taken in connection with the accompanying drawings which disclose several embodiments of the invention. It is to be understood, however, that the drawings are designed for the purpose of illustration only, and are not intended as a definition of the limits and scope of the invention.

Figure 2:
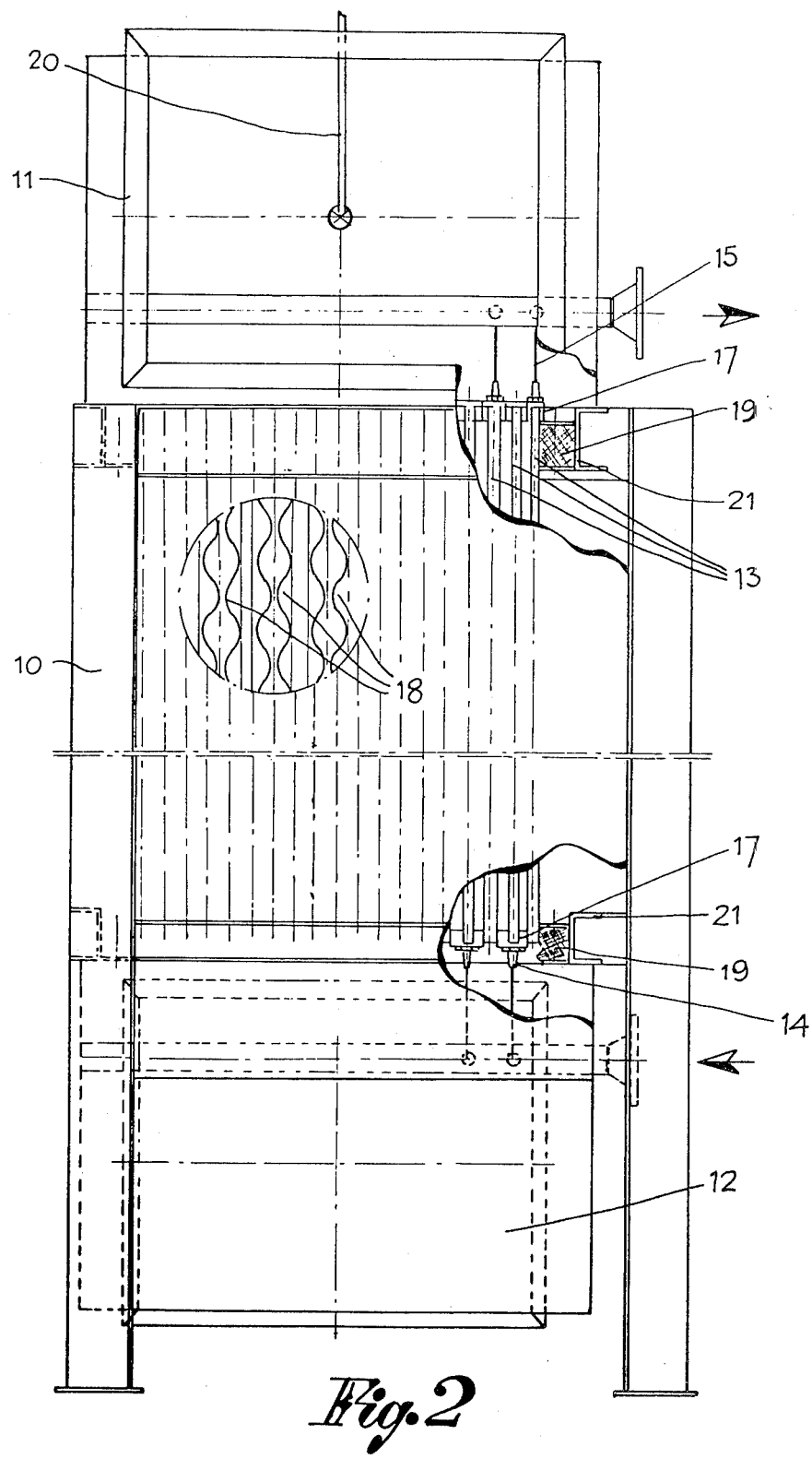

In the drawings, wherein similar reference characters denote similar elements throughout the several views:

FIG. 1 is a vertical cross-sectional view through one embodiment of the inventive device parallel with respect to the cooling plate; and FIG. 2 is a vertical cross-sectional view lateral with respect to the cooling plates.

In FIGS. 1 and 2, an air supply 11 and an air exhaust 12 are provided in a housing which consists essentially of supports and cover plates. Cooling plates 13 are tightly packed within housing 10 and are connected with hose socket 14 and elastic hoses 15 with cooling supply and discharge lines 16. The air is admitted from above into the housing and is exhausted below. The cooling water supply is carried out in counter current flow direction from the lower part of the plates to their upper end portions. This arrangement provides a very intensive heat exchange. Cooling plates 13 are mounted on carriers or supports within the housing by means of plate holders 17. Holders 17 are provided with a notch which engage the upper edge of cooling plates 13. This prevents the creation of a bending moment on socket 14 at which the holders are mounted, which would otherwise result in a loosening of the sockets, or a breaking of them off.

In the sectional view of FIG. 2, plates are shown which are perpendicular with respect to the surface of the plates, so as to show how the walls of the cooling plates may be provided with impressions 18. These impressions increase the heat exchange and the rigidity of the plates.

When the plates are telescopically moved toward each other as shown in FIG. 2, the plates are provided with housing seals 19 at their front surfaces so that the right housing side is closed by means of a support 21 and a corresponding cover. In order to clean cooling plates 13, support 21 and seals 19 are displaced one after the other to the right side in accordance with FIG. 2, so that an intermediate space is provided to insert a suitable cleaning device, such as, for example, a brush. For this purpose, a cover plate 22 is mounted on housing 10 which may be removed, so as to provide access between the plates. If need be, it may suffice to inject a chemical cleaning medium through a supply line 20 and into the exhaust air or into the air stream, so that the cleaning medium flows down between cooling plates 13 and removes impurities from the plates and is then discharged at a suitable place from the device, such as, for example, through the air exhaust.

While only a few embodiments of the present invention have been shown and described, it will be obvious that many changes and modifications may be made thereunto without departing from the spirit and scope of the invention.

What is claimed is:

1. A device for the cleaning and heat recovery from the exhaust gases in a production installation for drying and heat treatment in the textile industry using a cooling fluid, comprising:

a housing having a multiplicity of vertically disposed, parallel, double-walled cooling plates through which cooling fluid may flow, disposed adjacent one another with the outer lateral faces of adjacent plates opposing one another and each being provided with laterally extending corrugations serving as distance spacers, said housing having a common support on which said plates are flexibly and slidably mounted, for movement toward and away from one another so that, when said plates are moved closely adjacent one another, they define narrow passages therebetween for the flow of exhaust gases therethrough and, when said plates are moved apart, they define wide spaces between the plates to facilitate their cleaning;

means for supplying exhaust gases from above said plates and means for discharging exhaust gases from below said plates, the gases passing through the narrow spaces between the opposed outer lateral faces of said adjacent plates from said supply means to said exhaust means; and means for supplying cooling fluid coupled to the lower ends of said plates and means for discharging cooling fluid coupled to the upper ends of said plates, the fluid passing through the walls of said plates from said supply to said discharge means in a direction opposite to the flow of the exhaust gases.

2. The device according to claim 1 comprising elastic hoses serving as connectors between said cooling plates and the cooling supply and discharge means.

3. The device according to claim 1 comprising in combination plate supports for supporting said cooling plates in said housing.

4. The device according to claim 3 comprising connector sockets for mounting said plate support on said cooling plates for a cooling water connection.

5. The device according to claim 4 further comprising a line disposed in said housing and in said air supply for injecting a cleaning medium.

* * * * *